United States Patent
Harada

(10) Patent No.: US 12,420,568 B2
(45) Date of Patent: Sep. 23, 2025

(54) SYSTEM, INFORMATION PROCESSING APPARATUS, METHOD FOR DETERMINING TYPE OF RECORDING MEDIUM, AND STORAGE MEDIUM

(71) Applicant: CANON KABUSHIKI KAISHA, Tokyo (JP)

(72) Inventor: Keiko Harada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 18/470,113

(22) Filed: Sep. 19, 2023

(65) Prior Publication Data
US 2024/0001692 A1    Jan. 4, 2024

Related U.S. Application Data

(63) Continuation of application No. PCT/JP2022/011989, filed on Mar. 16, 2022.

(30) Foreign Application Priority Data

Mar. 26, 2021    (JP) ................................ 2021-053207

(51) Int. Cl.
| | | |
|---|---|---|
| *B41J 11/00* | (2006.01) | |
| *G06K 15/00* | (2006.01) | |
| *G06K 15/02* | (2006.01) | |

(52) U.S. Cl.
CPC ........... *B41J 11/009* (2013.01); *G06K 15/021* (2013.01); *G06K 15/4065* (2013.01); *G06K 15/408* (2013.01)

(58) Field of Classification Search
CPC . B41J 11/009; B41J 2/01; B41J 29/38; G06K 15/021; G06K 15/4065; G06K 15/408; G06K 15/1868; G06K 15/002
See application file for complete search history.

(56) References Cited

U.S. PATENT DOCUMENTS

2002/0156754 A1* 10/2002 Swimm .................. B41J 11/009
706/20

FOREIGN PATENT DOCUMENTS

| JP | H11320853 A | 11/1999 |
|---|---|---|
| JP | 2016215591 A | 12/2016 |
| JP | 2020163599 A | 10/2020 |
| JP | 2020163774 A | 10/2020 |

* cited by examiner

*Primary Examiner* — Bradley W Thies
(74) *Attorney, Agent, or Firm* — Canon U.S.A., Inc. IP Division

(57) ABSTRACT

A reference value of a characteristic value of an unset recording medium is determined based on correction values for types of recording media stored in an electrically erasable programmable read-only memory (EEPROM) in advance and a result of measurement of the unset recording medium.

15 Claims, 12 Drawing Sheets

FIG.7A

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| REGULAR REFLECTION VALUE V1L | V1L_a | V1L_b | V1L_c | V1L_d | V1L_e | V1L_f | V1L_g | V1L_h |
| DIFFUSED REFLECTION VALUE V2L | V2L_a | V2L_b | V2L_c | V2L_d | V2L_e | V2L_f | V2L_g | V2L_h |
| PAPER THICKNESS V3L | V3L_a | V3L_b | V3L_c | V3L_d | V3L_e | V3L_f | V3L_g | V3L_h |

FIG.7B

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| REGULAR REFLECTION CORRECTION VALUE α | α_a | α_b | α_c | α_d | α_e | α_f | α_g | α_h |
| DIFFUSED REFLECTION CORRECTION VALUE β | β_a | β_b | β_c | β_d | β_e | β_f | β_g | β_h |
| PAPER THICKNESS CORRECTION VALUE γ | γ_a | γ_b | γ_c | γ_d | γ_e | γ_f | γ_g | γ_h |
| REGULAR REFLECTION TRAINING VALUE 1 v1_1 | v1_a1 | v1_b1 | v1_c1 | v1_d1 | v1_e1 | v1_f1 | v1_g1 | v1_h1 |
| REGULAR REFLECTION TRAINING VALUE 2 v1_2 | v1_a2 | v1_b2 | v1_c2 | v1_d2 | v1_e2 | v1_f2 | v1_g2 | v1_h2 |
| DIFFUSED REFLECTION TRAINING VALUE 1 v2_1 | v2_a1 | v2_b1 | v2_c1 | v2_d1 | v2_e1 | v2_f1 | v2_g1 | v2_h1 |
| DIFFUSED REFLECTION TRAINING VALUE 2 v2_2 | v2_a2 | v2_b2 | v2_c2 | v2_d2 | v2_e2 | v2_f2 | v2_g2 | v2_h2 |
| PAPER THICKNESS TRAINING VALUE 1 v3_1 | v3_a1 | v3_b1 | v3_c1 | v3_d1 | v3_e1 | v3_f1 | v3_g1 | v3_h1 |
| PAPER THICKNESS TRAINING VALUE 1 v3_2 | v3_a2 | v3_b2 | v3_c2 | v3_d2 | v3_e2 | v3_f2 | v3_g2 | v3_h2 |

FIG.7C

| | PLAIN PAPER A | PLAIN PAPER B | PLAIN PAPER C | GLOSSY PAPER D | GLOSSY PAPER E | GLOSSY PAPER F | COATED PAPER G | COATED PAPER H |
|---|---|---|---|---|---|---|---|---|
| POSITIVE REGULAR REFLECTION EXTRACTION LIMIT VALUE J1 | J1_a | J1_b | J1_c | J1_d | J1_e | J1_f | J1_g | J1_h |
| NEGATIVE REGULAR REFLECTION EXTRACTION LIMIT VALUE J1' | J1'_a | J1'_b | J1'_c | J1'_d | J1'_e | J1'_f | J1'_g | J1'_h |
| POSITIVE REGULAR REFLECTION TRAINING LIMIT VALUE L1 | L1_a | L1_b | L1_c | L1_d | L1_e | L1_f | L1_g | L1_h |
| NEGATIVE REGULAR REFLECTION TRAINING LIMIT VALUE L1' | L1'_a | L1'_b | L1'_c | L1'_d | L1'_e | L1'_f | L1'_g | L1'_h |
| POSITIVE DIFFUSED REFLECTION EXTRACTION LIMIT VALUE J2 | J2_a | J2_b | J2_c | J2_d | J2_e | J2_f | J2_g | J2_h |
| NEGATIVE DIFFUSED REFLECTION EXTRACTION LIMIT VALUE J2' | J2'_a | J2'_b | J2'_c | J2'_d | J2'_e | J2'_f | J2'_g | J2'_h |
| POSITIVE DIFFUSED REFLECTION TRAINING LIMIT VALUE L2 | L2_a | L2_b | L2_c | L2_d | L2_e | L2_f | L2_g | L2_h |
| NEGATIVE DIFFUSED REFLECTION TRAINING LIMIT VALUE L2' | L2'_a | L2'_b | L2'_c | L2'_d | L2'_e | L2'_f | L2'_g | L2'_h |
| POSITIVE PAPER THICKNESS EXTRACTION LIMIT VALUE J3 | J3_a | J3_b | J3_c | J3_d | J3_e | J3_f | J3_g | J3_h |
| NEGATIVE PAPER THICKNESS EXTRACTION LIMIT VALUE J3' | J3'_a | J3'_b | J3'_c | J3'_d | J3'_e | J3'_f | J3'_g | J3'_h |
| POSITIVE PAPER THICKNESS TRAINING LIMIT VALUE L3 | L3_a | L3_b | L3_c | L3_d | L3_e | L3_f | L3_g | L3_h |
| NEGATIVE PAPER THICKNESS TRAINING LIMIT VALUE L3' | L3'_a | L3'_b | L3'_c | L3'_d | L3'_e | L3'_f | L3'_g | L3'_h |

SYSTEM, INFORMATION PROCESSING APPARATUS, METHOD FOR DETERMINING TYPE OF RECORDING MEDIUM, AND STORAGE MEDIUM

CROSS-REFERENCE TO RELATED APPLICATIONS

This application is a Continuation of International Patent Application No. PCT/JP2022/011989, filed Mar. 16, 2022, which claims the benefit of Japanese Patent Application No. 2021-053207, filed Mar. 26, 2021, both of which are hereby incorporated by reference herein in their entirety.

BACKGROUND OF THE INVENTION

Field of the Invention

The present invention relates to a system, an information processing apparatus, a method for determining a type of recording medium, and a storage medium.

Background Art

When a recording apparatus performs recording, it is known to perform recording using control parameters based on a type of recording medium. PTL 1 discusses measuring a plurality of characteristic values of a recording medium to be recorded and selecting a type of recording medium from types stored in advance to perform recording using appropriate control parameters.

CITATION LIST

Patent Literature

PTL 1: Japanese Patent Application Laid-Open No. 2016-215591

According to the method of Patent Literature 1, however, if a type of recording medium other than those stored in advance is used, the type of recording medium to be used is not selectable.

SUMMARY OF THE INVENTION

The present invention is directed to enabling selection of even a type of recording medium not stored in advance.

According to an aspect of the present invention, a system includes a first measurement unit configured to measure a characteristic of a recording medium, a first storage unit configured to store a reference value of a characteristic value corresponding to a type of recording medium in advance, a first extraction unit configured to extract a candidate for a type of recording medium measured by the first measurement unit based on a result of measurement by the first measurement unit and the reference value of the characteristic value stored in the first storage unit in advance, a first information acquisition unit configured to acquire information corresponding to a type of recording medium determined to be the type of recording medium measured by the first measurement unit, and a first correction value acquisition unit configured to acquire a correction value for correcting the reference value of the characteristic value of the type of recording medium indicated by the information acquired by the first information acquisition unit based on the reference value of the characteristic value of the type of recording medium indicated by the information and the result of measurement. The first extraction unit is configured to, in extracting a candidate next time, extract the candidate for the type of recording medium based on the reference value of the characteristic value and the correction value. The system further comprises a first determination unit configured to, if the first extraction unit extracts an unset recording medium that is not set in advance as a type of recording medium for the first extraction unit to extract, determine a reference value of a characteristic value of the unset recording medium based on a result of measurement of the characteristic of the unset recording medium by the first measurement unit and the correction value acquired by the first correction value acquisition unit for the type of recording medium stored in the first storage unit in advance. The first storage unit is configured to store the reference value of the characteristic value of the unset recording medium determined by the first determination unit.

Further features of the present invention will become apparent from the following description of exemplary embodiments with reference to the attached drawings.

BRIEF DESCRIPTION OF THE DRAWINGS

FIG. 7A is a table illustrating characteristic values stored in an electrically erasable programmable read-only memory (EEPROM) according to the exemplary embodiment.

FIG. 7B is a table illustrating characteristic values stored in the EEPROM according to the exemplary embodiment.

FIG. 7C is a table illustrating characteristic values stored in the EEPROM according to the exemplary embodiment.

DESCRIPTION OF THE EMBODIMENTS

<Overall Configuration>

Figure 1A:
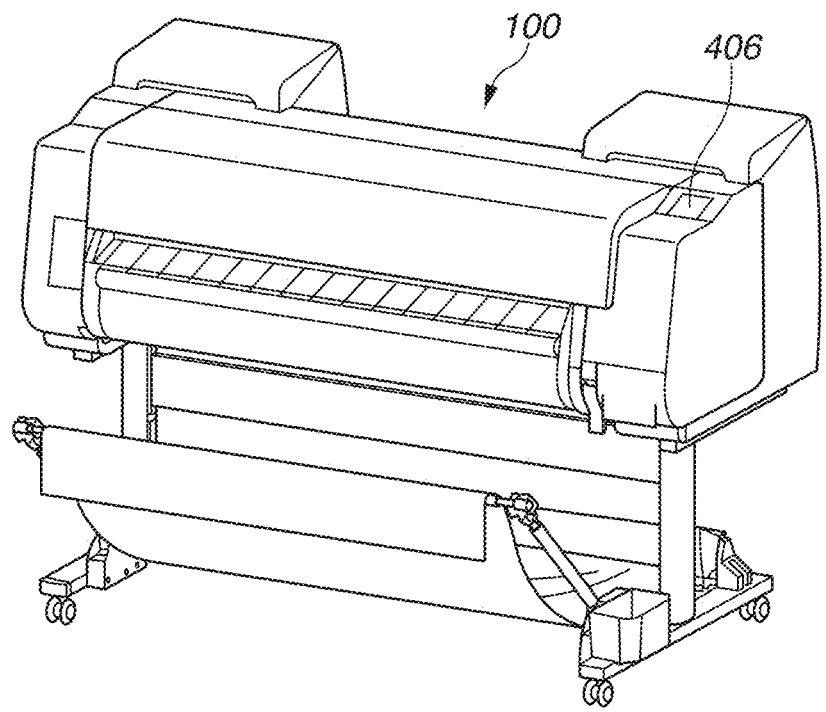
FIG. 1A is a perspective view illustrating a configuration of a recording apparatus according to an exemplary embodiment.
Figure 1B:
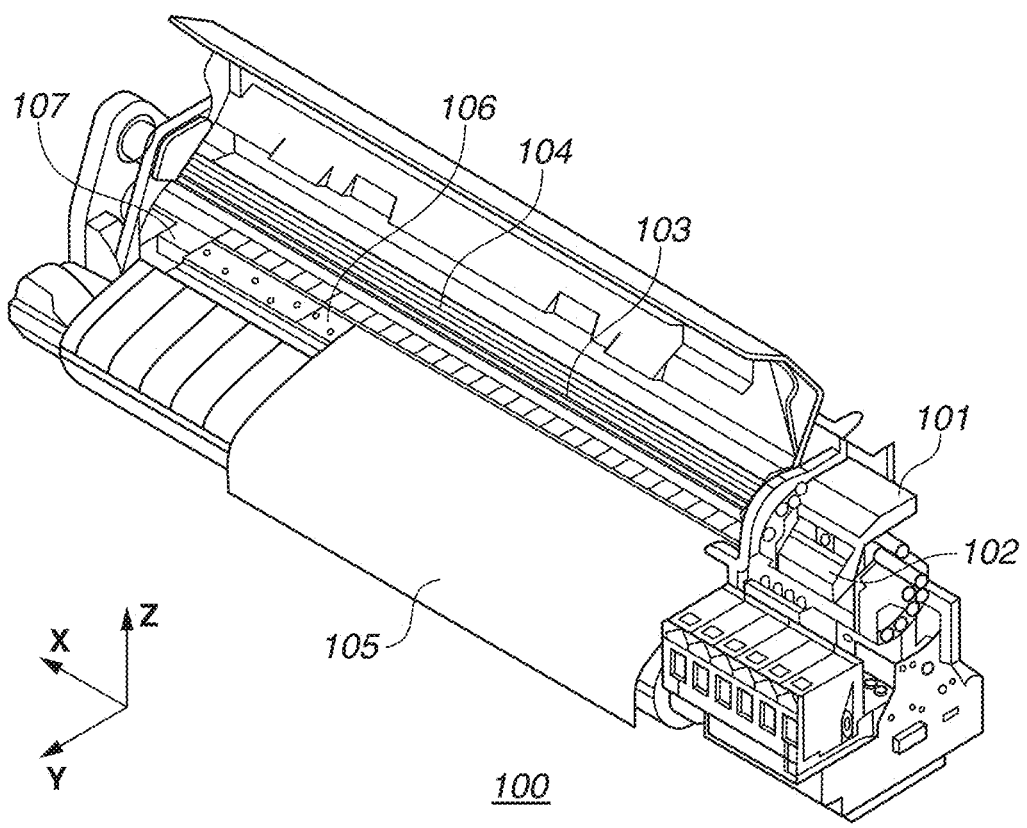
FIG. 1B is a perspective view illustrating a configuration of the recording apparatus according to the exemplary embodiment.

FIGS. 1A and 1B are perspective views illustrating a configuration of a recording apparatus 100. Casters and a sheet discharge basket are attached to the recording apparatus 100. FIG. 1A illustrates the overall appearance, and FIG. 1B illustrates a state where an upper cover is opened to show the internal structure. The recording apparatus 100 according to a first exemplary embodiment performs recording by applying ink droplets as a recording material onto a recording medium by using an inkjet recording method. The recording medium is conveyed with a Y direction as the conveyance direction. An inkjet recording apparatus including a serial recording head, where a carriage 101 on which recording heads 102 are mounted reciprocates in an X direction intersecting with the Y direction for recording, will be described. However, an inkjet recording apparatus including a line recording head, where a nozzle row is disposed across the recording width with respect to the conveyance direction of the recording medium, may be used. A multifunction peripheral (MFP) not only having the recording function but integrating a scan function, a facsimile (FAX) function, and a transmission function as well may be used. An electrophotographic recording apparatus using powder toner as a recording material may be used.

In the present exemplary embodiment, the function of an information processing apparatus for performing determination processing of a recording medium to be used to be described below is implemented on the recording apparatus 100.

The recording apparatus 100 includes an input-output unit 406 in its upper part. The input-output unit 406 is an operation panel. The input-output unit 406 displays the remaining ink level and candidates for a type of recording medium on a display, and the user can select a type of recording medium and make recording settings by operating keys.

The carriage 101 includes an optical sensor 201 (FIG. 2) and the recording heads 102 having a discharge port surface where discharge ports for discharging ink are formed. The carriage 101 is configured to be able to reciprocate in the X direction (direction of movement of the carriage 101) along a shaft 104 when driven by a carriage motor 415 (FIG. 4) via a carriage belt 103. In the present exemplary embodiment, the recording apparatus 100 can obtain a diffused reflection characteristic value and a regular reflection characteristic value at the surface of the recording medium 105 and measure a distance between the carriage 101 and the recording medium 105 using the optical sensor 201.

The recording medium 105, such as roll paper, is conveyed over a platen 106 in the Y direction by a not-illustrated conveyance roller. A recording operation is performed by the recording heads 102 discharging ink droplets while the carriage 101 moves in the X direction over the recording medium 105 that is conveyed onto the platen 106 by the conveyance roller. When the carriage 101 moves to an end of the recording area on the recording medium 105, the conveyance roller conveys the recording medium 105 by a certain amount to move the next area to be scanned for recording to a position recordable by the recording heads 102. Such operations are repeated to record an image.

<Configuration of Carriage>

Figure 2:
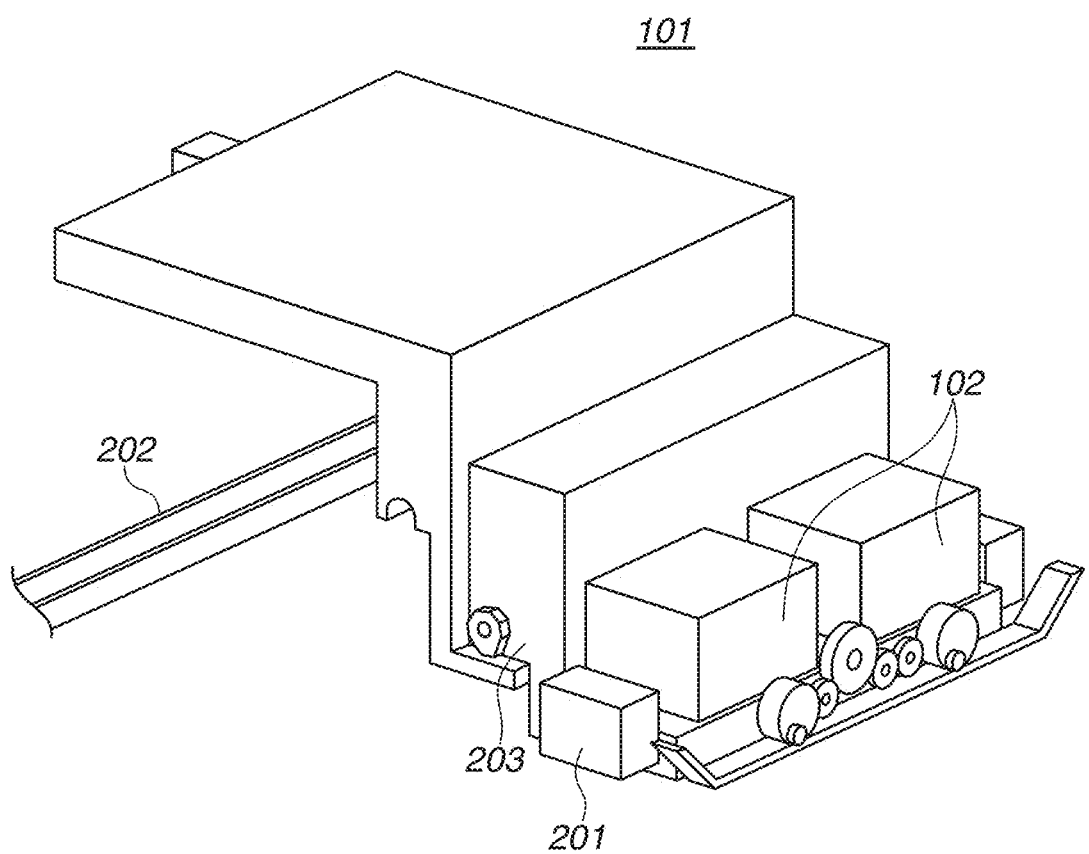
FIG. 2 is a diagram illustrating a configuration of a carriage according to the exemplary embodiment.

FIG. 2 is a diagram illustrating a configuration of the carriage 101. The carriage 101 includes a translator 202 and a head holder 203. The head holder 203 includes the recording heads 102 and the optical sensor 201 that is a reflection sensor. As illustrated in FIG. 2, the optical sensor 201 is configured such that its bottom surface is located at the same position as or above the bottom surfaces of the recording heads 102.

<Configuration of Optical Sensor>

Figure 3:
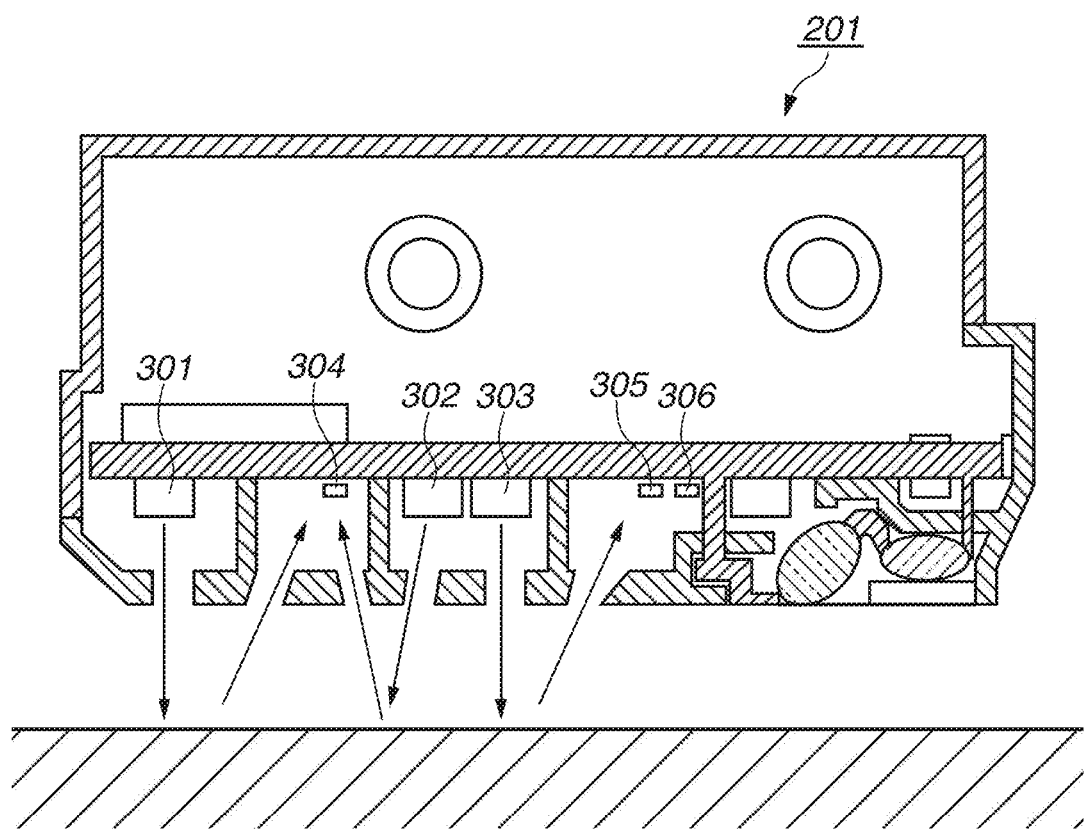
FIG. 3 is a diagram illustrating a configuration of an optical sensor according to the exemplary embodiment.

FIG. 3 is a schematic sectional view illustrating a configuration of the optical sensor 201. The optical sensor 201 includes a first light-emitting diode (LED) 301, a second LED 302, a third LED 303, a first photodiode 304, a second photodiode 305, and a third photodiode 306, as optical elements. The first LED 301 is a light source having an irradiation angle normal (90°) to the surface (measurement surface) of the recording medium 105. The first photodiode 304 receives light emitted from the first LED 301 and reflected from the recording medium 105 at an angle of 45° in a Z direction. In other words, the first LED 301 and the first photodiode 304 form an optical system for detecting a diffused reflection component of the reflected light from the recording medium 105.

The second LED 302 is a light source having an irradiation angle of 60° in the Z direction with respect to the surface (measurement surface) of the recording medium 105. The first photodiode 304 receives light emitted from the second LED 302 and reflected from the recording medium 105 at an angle of 60° in the Z direction. In other words, the angle of light emission and the angle of light reception are the same, and the second LED 302 and the first photodiode 304 form an optical system for detecting a regular reflection component of the reflected light from the recording medium 105.

The third LED 303 is a light source having an irradiation angle normal (90°) to the surface (measurement surface) of the recording medium 105. The second photodiode 305 and the third photodiode 306 receive light emitted from the third LED 303 and reflected from the recording medium 105. The second photodiode 305 and the third photodiode 306 measure the distance between the optical sensor 201 and the recording medium 105 based on a change in the amount of received light depending on the distance between the optical sensor 201 and the recording medium 105.

In the present exemplary embodiment, the optical sensor 201 is installed on the carriage 101. However, other configurations may be employed. For example, the optical sensor 201 may be fixed to the recording apparatus 100. Alternatively, a measurement device for measuring the diffused reflection and regular reflection characteristic values of a recording medium may be provided separately from the recording apparatus 100, and the characteristic values measured by the measurement device may be transmitted to the recording apparatus 100.

<Block Diagram>

Figure 4:
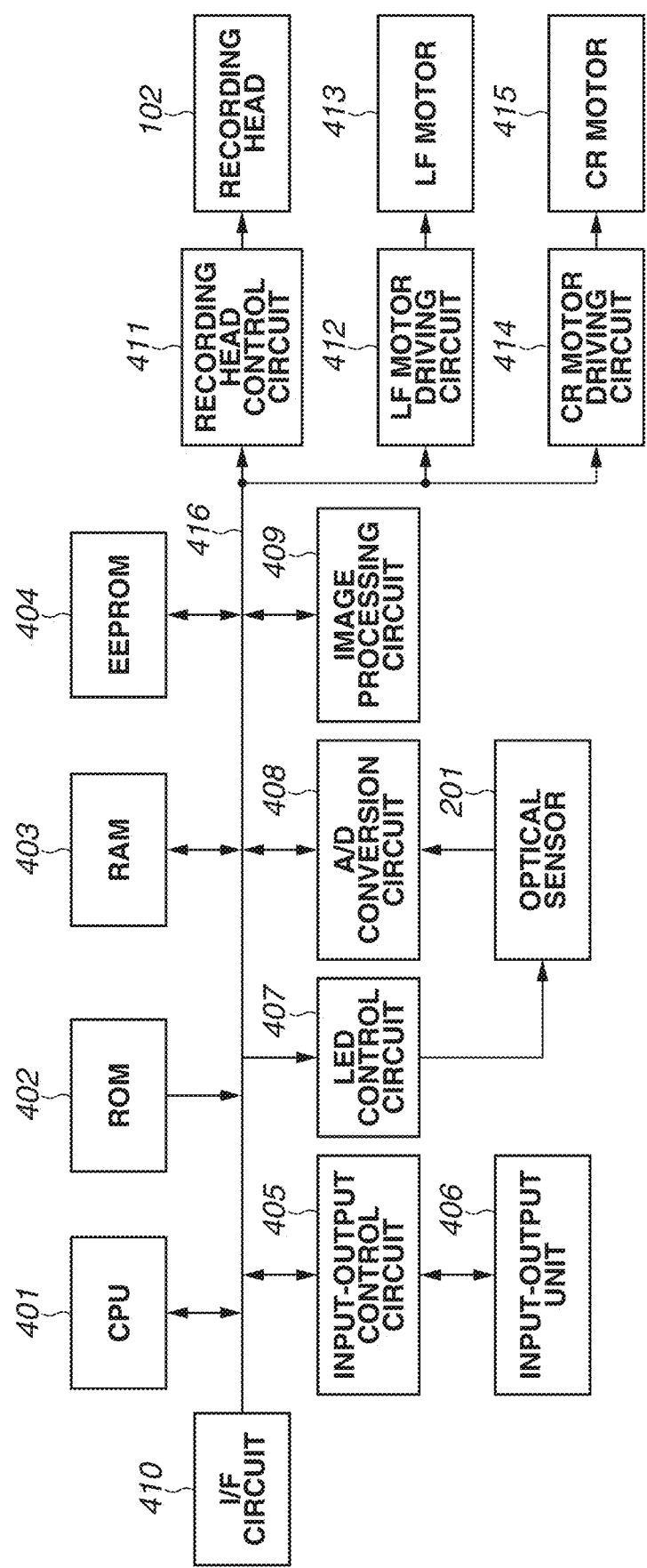
FIG. 4 is a diagram illustrating a block configuration of a control system of the recording apparatus according to the exemplary embodiment.

FIG. 4 is a diagram illustrating a block configuration of a control system of the recording apparatus 100. A read-only memory (ROM) 402 is a nonvolatile memory, and stores a control program for controlling the recording apparatus 100 and a program for implementing an operation of the present exemplary embodiment, for example. The operation of the present exemplary embodiment is implemented, for example, by a central processing unit (CPU) 401 reading a program stored in the ROM 402 into a random access memory (RAM) 403 and executing the program. The RAM 403 is also used as a working memory of the CPU 401. An electrically erasable programmable read-only memory (EE- PROM) 404 stores data to be retained even when the recording apparatus 100 is powered off. At least the CPU 401 and the ROM 402 implement the function of the information processing apparatus for performing recording medium determination processing to be described below. The EEPROM 404 stores characteristic values of recording media to be used as predetermined references, categories of the recording media, and types of recording media used (use history). The categories are broad classifications of the types of recording media. In the present exemplary embodiment, there are set five categories, namely, glossy paper, plain paper, coated paper, film sheets, and special. For example, if a recording medium is standard glossy paper, the recording medium is classified into the glossy paper category. If a recording medium is premium plain paper, the recording medium is classified into the plain paper category.

While the recording media also include non-paper media, the term "sheet" is used in issuing user notifications in the present exemplary embodiment. Use history information and the characteristic values of the recording media can be stored in a ROM of a host computer or an external memory of a server instead of a storage medium in the recording apparatus 100.

An interface (I/F) circuit 410 connects the recording apparatus 100 with an external network, such as a local area network (LAN). The recording apparatus 100 transmits and receives various jobs and data to/from external apparatuses. such as a host computer, via the I/F circuit 410.

The input-output unit 406 includes an input unit and an output unit. The input unit accepts a power-on instruction, a recording execution instruction, and instructions to set various functions from the user. The output unit displays various types of apparatus information, such as a power saving mode, and setting screens of various functions executable by the recording apparatus 100. In the present exemplary embodiment, the input-output unit 406 is an operation panel disposed on the recording apparatus 100. The input-output unit 406 is connected to a system bus 416 via an input-output control circuit 405 to be capable of data transmission and reception. In the present exemplary embodiment, the CPU 401 performs information notification control on the output unit.

Alternatively, the input unit may be a keyboard of an external host computer, and may be able to accept user instructions from the external host computer. The output unit can be an LED display, a liquid crystal display (LCD), or a display connected to a host apparatus. If the input-output unit is a touchscreen, instructions from the user can be accepted using software keys. The input-output unit 406 can be a speaker and a microphone, and accept an input from the user as a voice input and issue a notification to the user as a voice output.

An information processing apparatus that includes a CPU and a ROM having similar functions to those of the CPU 401 and the ROM 402 and is externally connected to the recording apparatus 100 can perform the recording medium determination processing to be described below and determine the recording medium to be used by the recording apparatus 100.

In performing measurement using the optical sensor 201, the CPU 401 drives an LED control circuit 407 to control lighting of a predetermined LED in the optical sensor 201. The photodiodes of the optical sensor 201 output signals based on the received light. The signals are converted into digital signals by an analog-to-digital (A/D) conversion circuit 408 and once stored in the RAM 403. Data to be retained even when the recording apparatus 100 is powered off is stored in the EEPROM 404.

A recording head control circuit 411 supplies drive signals based on recording data to nozzle driving circuits that are disposed in the recording heads 102 and include selectors and switches, and controls the recording operation of the recording heads 102, such as the driving order of the nozzles. For example, when recording target data is transmitted from outside to the I/F circuit 410, the recording target data is once stored in the RAM 403. The recording head control circuit 411 then drives the recording heads 102 based on recording data into which the recording target data is converted for recording purposes. Here, a line feed (LF) motor driving circuit 412 drives an LF motor 413 based on the bandwidth of the recording data. The conveyance roller connected to the LF motor 413 rotates to convey a recording medium. A carriage (CR) motor driving circuit 414 causes the carriage 101 to scan via the carriage belt 103 by driving a carriage (CR) motor 415.

Data transmitted from the I/F circuit 410 includes not only recording target data but also data on settings made by a printer driver. For example, recording target data can be either received from outside via the I/F circuit 410 and stored in a storage unit, or stored in a storage unit, such as a hard disk, in advance. The CPU 401 reads image data from a storage unit and controls an image processing circuit 409 to perform conversion (binarization processing) into recording data for using the recording heads 102. Aside from the binarization processing, the image processing circuit 409 performs various types of image processing, including color space conversion, horizontal-to-vertical (HV) conversion, gamma correction, and image rotation.

<Recording Medium Determination Processing>

Figure 5:
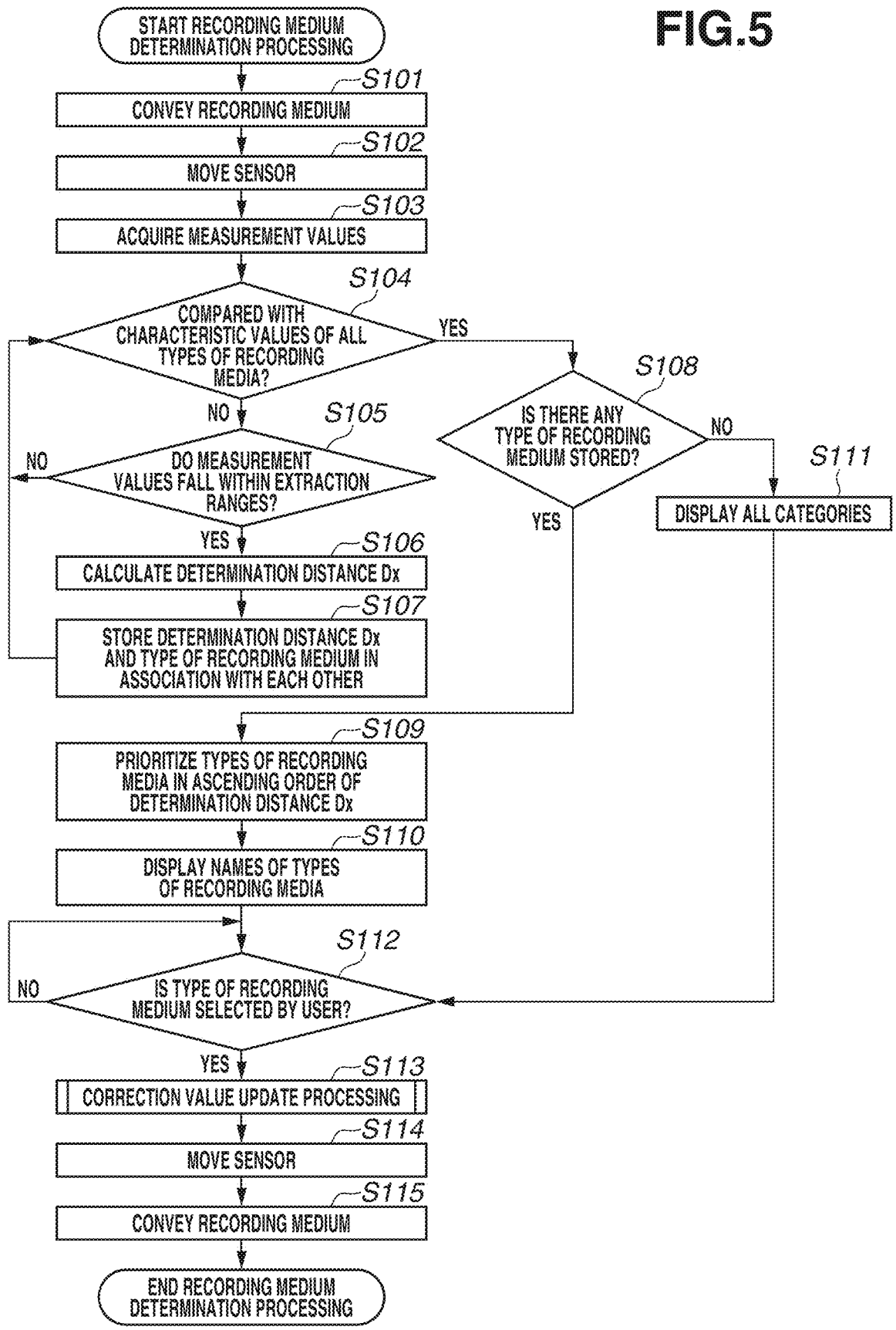
FIG. 5 is a flowchart illustrating recording medium determination processing according to the exemplary embodiment.

FIG. 5 is a flowchart illustrating the recording medium determination processing for acquiring a measurement result obtained by measuring the characteristics of a recording medium 105 to be recorded, and notifying the input-output unit 406 of recording medium candidates based on the measurement result to determine the type of recording medium to be recorded. In the following recording medium determination processing, measurements of the characteristic values of the type of recording medium selected by the user are acquired as new information, and characteristic values determined in advance are modified to approach the measurements based on the new information. Through such training, characteristic values enabling more accurate selection of the type of recording medium are acquired.

The processing of each of steps S101 to S115 in FIG. 5 is implemented, for example, by the CPU 401 illustrated in FIG. 4 reading a program stored in the ROM 402 into the RAM 403 and executing the program. Alternatively, the recording medium determination processing may be performed by software on a host apparatus. In the present exemplary embodiment, the input-output unit 406 is an operation panel disposed on the recording apparatus 100, and recording medium candidates are thus notified by displaying the names of the recording media on the operation panel. The input-output unit 406 may be constituted by a display connected to a host apparatus and the host apparatus. If the input-output unit 406 is a speaker having a microphone function capable of inputting and outputting voice, the recording medium candidates are notified using the speaker, and a recording medium is selected by the user voice-inputting the name of the recording medium or a corresponding code to the microphone.

Figure 6A:
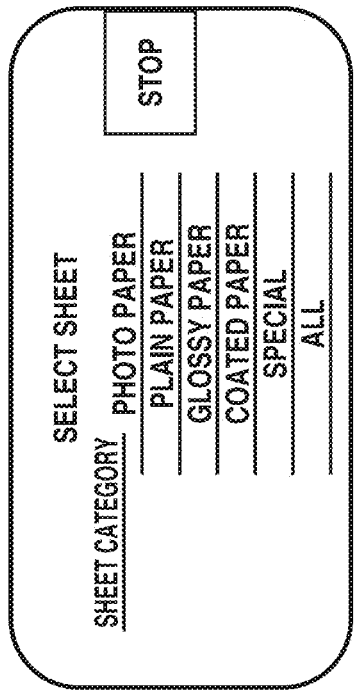
FIG. 6A is a diagram illustrating a display mode of an input-output unit according to the exemplary embodiment.

The CPU 401 starts the recording medium determination processing illustrated in FIG. 5 when the operation panel that is the input-output unit 406 accepts an instruction to start feed processing from the user. FIG. 6A illustrates a display example of the operation panel for accepting the input of the instruction to start the feed processing. The operation panel is a touchscreen on which the user can make a touch input. If an item "YES" is touched, then in step S101, sheet feeding is started and the recording medium 105 is conveyed by the conveyance roller to a position capable of detection by the optical sensor 201 on the platen 106.

In step S102, with the recording medium 105 conveyed, the carriage 101 moves in the X direction to move the optical sensor 201 to above the recording medium 105.

In step S103, the CPU 401 acquires a regular reflection value V1, a diffused reflection value V2, and a thickness value (hereinafter, paper thickness) V3 of the recording medium 105 using the optical sensor 201. The diffused reflection value V2 corresponds to the degree of whiteness of the recording medium 105. The regular reflection value V1 corresponds to the degree of glossiness of the recording medium 105. The recording medium determination processing can be performed by using the width of the recording medium 105 in the X direction as a characteristic of the recording medium 105. The characteristics of the recording medium 105 can be measured at one point, or measurement results of a plurality of points can be averaged. The characteristics can be measured with the optical sensor 201 stopped or moved. The measurements are once stored in a memory, such as the RAM 403.

Next, in the processing of steps S104 to S107, the CPU 401 reads the acquired measurements from the memory, and compares the measurements with those of various recording media determined and stored in the EEPROM 404 in advance. Types of recording media of which the degree of matching with the characteristics indicated by the measurements is higher than a predetermined degree are thereby extracted. Details are described below.

In step S104, the CPU 401 determines whether the measurements have been compared with the characteristic values of all the types of recording media stored in the EEPROM 404. If the comparison is determined to have been completed (YES in step S104), the processing proceeds to step S108.

If, in step S104, the comparison is determined to not have been completed (NO in step S104), the processing proceeds to step S105. In step S105, the CPU 401 compares the characteristic values of a type of recording medium with the measurements. FIG. 7A illustrates the characteristic values of each type of recording medium stored in the EEPROM 404. The characteristic values are set to values determined in advance and remain unchanged. The diffused reflection value and the regular reflection value stored are values obtained by A/D-converting the output voltages output by the optical sensor 201 as a result of light reception in 10 bits. FIG. 7B illustrates correction values and training values stored in the EEPROM 404. The training values will be described below. The correction values are values to be updated by training. In the present exemplary embodiment, all the correction values are set to 0 at the stage of factory shipment, and updated by correction value update processing to be described with reference to FIG. 9. Values obtained by correcting the predetermined reference values of the characteristic values illustrated in FIG. 7A with the correction values illustrated in FIG. 7B serve as characteristic values to be compared with the measurements (hereinafter, comparative values). The comparative values are compared with the measurements to determine the type of recording medium 105. In the present exemplary embodiment, values obtained by multiplying the predetermined characteristic values by the correction values serve as reference correction values. For example, the comparative value of the regular reflection value of plain paper A is the reference value (V1L$\_a$) of the regular reflection value×the correction value ($\alpha\_a$). The type of recording medium is detected with first ranges from positive extraction limit values to negative extraction limit values illustrated in FIG. 7C with respect to such comparative values of the characteristic values as extraction ranges. For example, the positive extraction limit value of the regular reflection value of plain paper A is J1$\_a$, and the negative extraction limit value is J1'$\_a$. The extraction range of the regular reflection value of plain paper A is therefore from (V1L$\_a$)×($\alpha\_a$)+(J1'$\_a$) to (V1L$\_a$)×($\alpha\_a$)+(J1$\_a$). In step S105, the CPU 401 determines whether the measurements measured in step S103 fall within the extraction ranges of a predetermined type of recording medium. If not (NO in step S105), the processing returns to step S104 to make a determination about the next type of recording medium. If the measurements fall within the extraction ranges (YES in step S105), the processing proceeds to step S106.

In step S106, the CPU 401 calculates a determination distance Dx indicating the closeness of the measurements to the comparative values of the characteristic values. The smaller the value of the determination distance Dx to the comparative values of the characteristic values, the closer that type of recording medium is to the type of recording medium measured. For example, a formula for calculating the determination distance Dx in the case of plain paper A is given by the following:

$$Dx=\{V1-(\alpha\_a)\times(V1L\_a)\}^2+\{V2-(\beta\_a)\times(V2L\_a)\}^2+\{V3-(\gamma\_a)\times(V3L\_a)\}^2.$$

The method for calculating the determination distance Dx is not limited to the foregoing formula, and any method capable of calculating the similarity between the measurements and the comparative values of the characteristic values can be used. In the present exemplary embodiment, the distance between all the measurements acquired and the comparative values of the characteristic values is determined in an integrated manner. However, distances can be separately determined for the respective characteristic values and the closeness to the measurements can be determined if correlations therebetween are low. If, for example, the correlation of the paper thickness is low compared to that between the regular reflection value and the diffused reflection value, the distances can be determined as follows:

$$Dx1=\{V1-(\alpha\_a)\times(V1L\_a)\}^2+\{V2-(\beta\_a)\times(V2L\_a)\}^2,$$
and
$$Dx2=\{V3-(\gamma\_a)\times(V3L\_a)\}^2,$$

where Dx1 is a determination distance of the regular reflection value V1 and the diffused reflection value V2, and Dx2 is a determination distance of the paper thickness V3.

The CPU 401 then sets thresholds for the respective determination distances Dx1 and Dx2, and makes a determination.

In step S107, the CPU 401 temporarily stores the determination distance Dx calculated in step S106 and the type of recording medium into the RAM 403 in association with each other.

Figure 6B:
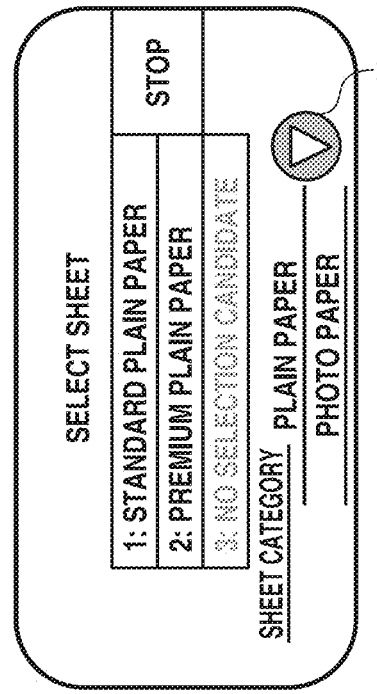
FIG. 6B is a diagram illustrating a display mode of the input-output unit according to the exemplary embodiment.
Figure 6C:
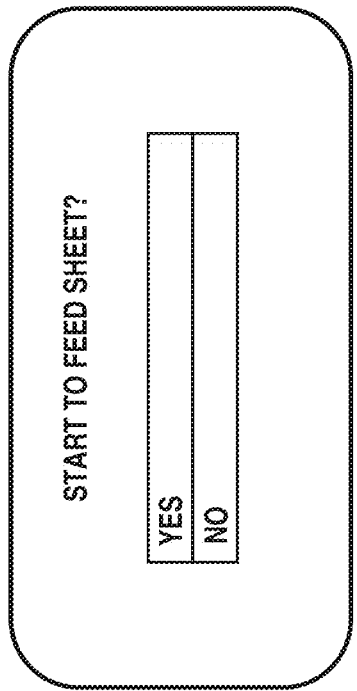
FIG. 6C is a diagram illustrating a display mode of the input-output unit according to the exemplary embodiment.

If the processing of steps S104 to S107 has been performed on all the types of recording media (YES in step S104), the processing proceeds to step S108. In step S108, the CPU 401 determines whether there is any type of recording medium stored in the RAM 403. If there is no type of recording medium stored in the RAM 403 (NO in step S108), the processing proceeds to step S111. In step S111, the CPU 401 displays all the categories on the operation panel as illustrated in FIG. 6B. The categories are arranged and displayed in a predetermined order. If the categories are displayed and the input of a category selected by the user is accepted, the types of recording media in the category are displayed as illustrated in FIG. 6C. The CPU 401 then accepts the input of a type of recording medium selected among the types of recording media displayed. The input is made by touching the item displaying the name of the recording medium. In FIG. 6B, an item "all" is displayed to the bottom aside from the categories of the recording media. If this "all" is selected, all the recording media are displayed in a predetermined order. The recording media can be displayed in order from the most recently used one, i.e., the last used one.

In step S108, if there is any type of recording medium stored in the RAM 403 (YES in step S108), the processing proceeds to step S109. In step S109, the CPU 401 prioritizes the stored types of recording media in ascending order of the determination distance Dx.

Figure 6D:
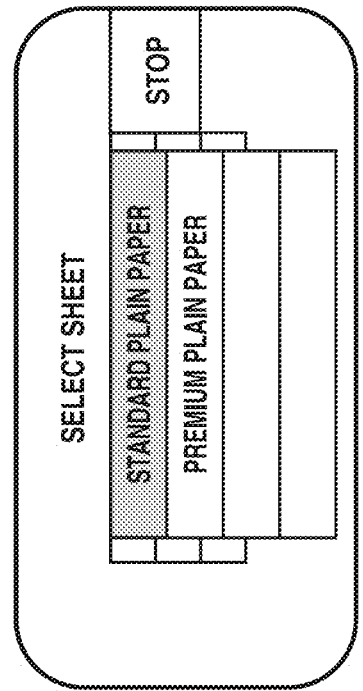
FIG. 6D is a diagram illustrating a display mode of the input-output unit according to the exemplary embodiment.

In step S110, the CPU 401 displays the names of the types of recording media in descending order of the priority determined in step S109 as illustrated in FIG. 6D.

The screen display can be scrolled down by touching a button 40 displayed on the operation panel of FIG. 6D. If "STOP" is touched, the recording medium determination processing is aborted, and the display of FIG. 6A is switched to the display of a home screen. In FIG. 6D, symbols 1 to 3 are displayed next to the names of the recording media in descending order of the priority. A type of recording medium is selected by touching the item of the name of the recording medium displayed. Here, standard plain paper numbered 1 has the highest priority. Any symbols indicating the order of priority can be used, including ones other than numerals. The display method is not limited thereto, either, and any display method can be used as long as the user can recognize the order of priority.

In FIG. 6D, top three candidate recording media can be displayed. Since two types of recording media are extracted, only two recording media are displayed in FIG. 6D. The third field displays "no selection candidate" in light (or dim) color to be less conspicuous than the names of the foregoing two recording media, whereby the user is notified that there is no third candidate. For example, if the background color of the operation panel is black, the two recording media are displayed in white, and the message "no selection candidate" in gray that is a color of lower brightness than white. Sheet categories are displayed under the message "no selection candidate". This enables the user to individually select other types of recording media if the recording media displayed on the input-output unit 406 do not include one desired by the user.

In the present exemplary embodiment, the category to which the type of recording medium ranked No. 1 belongs is displayed at the top. Categories of similar characteristics are displayed at high ranks to facilitate selection, whereby the time and trouble to select a desired recording medium category can be reduced even if there is no recording medium desired by the user among the candidate recording media.

Figure 8A:
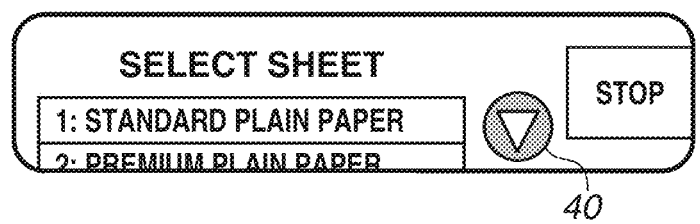
FIG. 8A is a diagram illustrating another mode of the input-output unit.
Figure 8B:
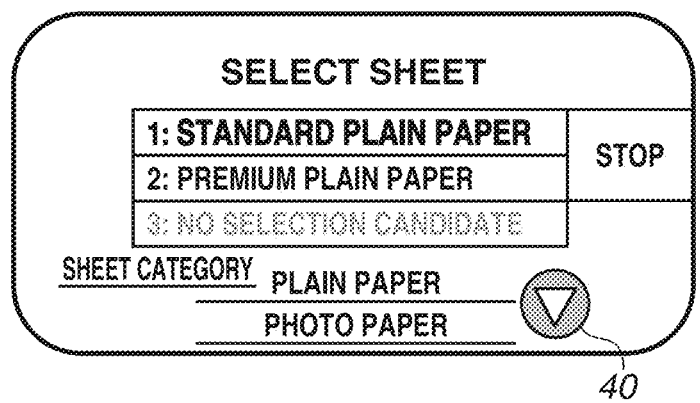
FIG. 8B is a diagram illustrating the other mode of the input-output unit.
Figure 8C:
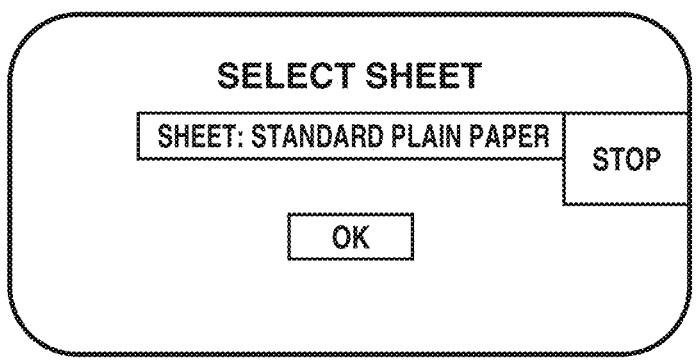
FIG. 8C is a diagram illustrating the other mode of the input-output unit.

FIGS. 8A, 8B, and 8C illustrate methods for displaying candidates for the type of recording medium on the input-output unit 406 in other modes. Like FIG. 8A, if all the candidates for the type of recording medium are unable to be displayed on the operation panel, candidates of low ranks can be displayed by scroll operations. The candidates do not necessarily need to be displayed in order from the top, as long as the user can recognize the order of priority. The name of the highest ranked recording medium can be displayed at the center of the operation panel. Like FIG. 8B, the name of the recording medium of the high priority can be displayed in large letters or bold letters to express the order of priority. While categories are displayed under the display "sheet category", the categories can be displayed without the display meaning "sheet category". Instead of the categories, types of recording media other than the candidates can also be displayed under the candidate recording media.

Like FIG. 8C, only the recording medium of the top priority can be displayed. If the user wants to select other recording media extracted, the recording medium item labeled standard plain paper can be selected in FIG. 8C. When this selection is accepted, the screen display can be switched to a screen similar to that of FIG. 6D to enable selection of other recording media.

In step S112, if the user selects a type of recording medium from the input-output unit 406 (YES in step S112), the processing proceeds to step S113. In step S113, the CPU 401 updates the correction values with trained values. The correction value update processing will be described below.

In step S114, the CPU 401 moves the carriage 101 to a standby position. In step S115, the CPU 401 conveys the recording medium 105 to a standby position intended for recording by the recording head 102, using the conveyance roller.

This ends the recording medium determination processing, and the recording apparatus 100 starts recording upon reception of a recording job from the user. Recording parameters based on the type of recording medium are preset and stored in the EEPROM 404. The parameters to be used for the recording of the recording job are determined based on the type of recording medium determined by the foregoing recording medium determination processing. The recording parameters include the amount of ink to be discharged and the amount of conveyance.

If the type of recording medium selected and input by the user from the input-output unit 406 and the type of recording medium of the job transmitted from the host computer to the recording apparatus 100 are different, the correction values for the recording medium stored in the EEPROM 404 can be left unupdated.

<Correction Value Update Processing>

Figure 9:
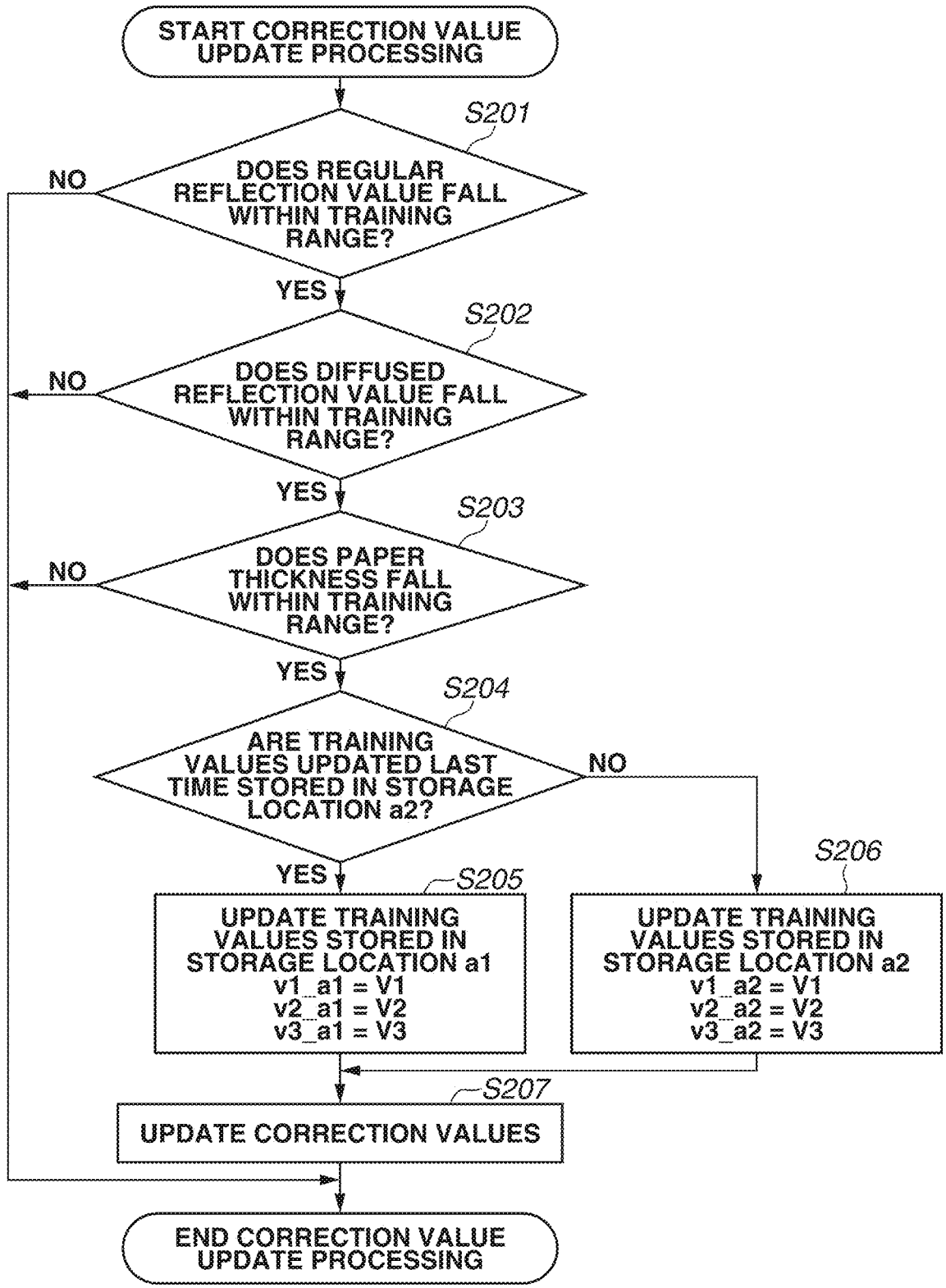
FIG. 9 is a flowchart illustrating correction value update processing according to the exemplary embodiment.

FIG. 9 is a flowchart illustrating the correction value update processing on the recording medium in step S113 of FIG. 5. A description will be given by using a case where the user selects plain paper A in step S112 of FIG. 5 as an example.

The CPU 401 determines whether the measurements fall within respective training ranges that are second ranges of the selected recording medium (here, plain paper A). The training ranges will now be described. If training is performed based on measurements significantly different from the comparative values of the characteristic values, incorrect values can be learned. For such a reason, there are set training ranges that are ranges of measurements to be learned. In the present exemplary embodiment, the training ranges are ranges a predetermined distance wider than the extraction ranges. With respect to the comparative values of the characteristic values, ranges from the respective positive training limit values to negative training limit values illustrated in FIG. 7C are assumed as training ranges. The training limit values are stored in the EEPROM 404. Different distances can be set as the predetermined distance between the extraction ranges and the training ranges, depending on each type of recording medium. If the measurements fall within the training ranges of the selected recording medium, the correction values are modified. A predetermined number of measurements are stored in the EEPROM 404 as training values of plain paper A, and the correction values are updated based on the training values. The present exemplary embodiment deals with a case where two training values are stored for each measurement.

In step S201, the CPU 401 determines whether the measured regular reflection value V1 falls within the training range of the regular reflection value of plain paper A. The training range of the regular reflection value of plain paper A is from $(V1L\_a) \times (\alpha\_a) + (L1'\_a)$ to $(V1L\_a) \times (\alpha\_a) + (L1\_a)$. If the measured regular reflection value V1 does not fall within the training range (NO in step S201), the correction value update processing ends since the correction values are not to be updated. If the measured regular reflection value V1 falls within the training range (YES in step S201), the processing proceeds to step S202.

In step S202, the CPU 401 determines whether the measured diffused reflection value V2 falls within the training range of the diffused reflection value of plain paper A. The training range of the diffused reflection value of plain paper A is from $(V2L\_a) \times (\beta\_a) + (L2'\_a)$ to $(V2L\_a) \times (\beta\_a) + (L2\_a)$. If the measured diffused reflection value V2 does not fall within the training range (NO in step S202), the correction value update processing ends since the correction values are not to be updated. If the measured diffused reflection value V2 falls within the training range (YES in step S202), the processing proceeds to step S203.

In step S203, the CPU 401 determines whether the measured paper thickness V3 falls within the training range of the paper thickness of plain paper A. The training range of the paper thickness of plain paper A is from $(V3L\_a) \times (\gamma\_a) + (L3'\_a)$ to $(V3L\_a) \times (\gamma\_a) + (L3\_a)$. If the measured paper thickness V3 does not fall within the training range (NO in step S203), the correction value update processing ends since the correction values are not to be updated. If the measured paper thickness V3 falls within the training range (YES in step S203), the CPU 401 stores the measurements into the EEPROM 404 as training values since all the characteristics fall within the training ranges. The processing proceeds to step S204.

In step S204, to update the training values stored in the EEPROM 404, the CPU 401 determines whether training values updated last time are stored in storage location a2. If the storage location is a2 (YES in step S204), the processing proceeds to step S205. In step S205, the CPU 401 updates training values stored in storage location a1 with the measurements. If the storage location is a1 (NO in step S204), the processing proceeds to step S206. In step S206, the CPU 401 updates the training values stored in storage location A2 with the measurements. The training values stored in the EEPROM 404 are selected if the recording medium to be recorded is plain paper A. The EEPROM 404 stores two sets of training values, or the previous and the previous but one training values, that are measurements within the training ranges. In steps S204 to S206, the CPU 401 overwrites and updates the oldest training values, or the previous but one training values, with the current measurements.

In step S207, the CPU 401 determines averages of the training values stored in the EEPROM 404, calculates the ratios of difference from the comparative values of the characteristic values, and updates the correction values with the calculated ratios. For example, the correction values for plain paper A can be calculated as follows:

$$(\alpha\_a) = (V1L\_a) / \{(v1\_a1) + (v1\_a2)\},$$

$$(\beta\_a) = (V2L\_a) / \{(v2\_a1) + (v2\_a2)\}.$$

$$(\gamma\_a) = (V3L\_a) / \{(v3\_a1) + (v3\_a2)\}.$$

This ends the correction value update processing.

In the foregoing mode, the correction values at factory shipment are 0, and the correction values are updated when the user feeds a sheet. However, the correction value update processing can be performed at the factory to store updated correction values. The correction values stored at factory shipment can be prevented from being updated at the user location, or updated as in the processing of FIG. 5. The correction values stored at the factory and the correction values calculated at the user location can be stored in a memory as separate correction values.

A procedure for setting a sheet prepared by the user (hereinafter, referred to as a user-registered sheet), which is an unset type of recording medium not set as a type of recording medium to be extracted, as a selectable sheet will be described with reference to FIGS. 10A and 10B. As employed herein, a preselectable type of recording medium refers to a type stored to be selectable in the EEPROM 404 before the start of this processing. In the present exemplary embodiment, the reference values of the user-registered sheet set in a recording apparatus 702 are set to be applicable to other apparatuses (in the following description, a recording apparatus 703). The following description will be given by using a procedure where a host computer 701 registers the user-registered sheet in the recording apparatus 702 as an example. The host computer 701 is a computer connected to the recording apparatus 702 to be capable of information communication with the recording apparatus 702 via the I/F circuit 410. The recording apparatuses 702 and 703 are recording apparatuses each having the configuration of the recording apparatus 100 described above, with respective reference numerals for individual identification.

In step S711, the user sets the user-registered sheet as an unset type of recording medium by using an application for operating parameters of a recording medium to be used by a recording apparatus, installed on the host computer 701. Using the application, the user sets a sheet name and predetermined printing parameters that can be set without information about the recording apparatus 702. The predetermined printing parameters here refer to parameters that do not change from one recording apparatus to another. Examples include the amount of ink to be discharged tailored to the surface properties of the recording medium, and parameters for specifying a motor operation during conveyance based on the weight of the recording medium. Image processing parameters can be included, as well as an International Color Consortium (ICC) color profile. The set sheet name and printing parameters are stored in the host computer 701 in association with each other.

In step S712, the host computer 701 transmits information indicating the sheet name and the printing parameters set in step S711 to the recording apparatus 702 via the I/F circuit 410 of the recording apparatus 702 by communication, such as Universal Serial Bus (USB) communication.

In step S713, the recording apparatus 702 acquires the sheet name and the printing parameters transmitted from the host computer 701, and stores the sheet name and the printing parameters into a memory in the recording apparatus 702. Here, the sheet name and the printing parameters are stored into the EEPROM 404. After the completion of the storage, in step S714, the recording apparatus 702 transmits information indicating the completion of registration to the host computer 701.

The host computer 701 receives the information indicating the completion of registration. In step S715, the host computer 701 transmits information for requesting acquisition of characteristic values for estimating the type of recording medium to the recording apparatus 702.

The recording apparatus 702 receives the information for requesting the acquisition of the characteristic values. In step S716, the recording apparatus 702 then issues a notification prompting the user to feed the user-registered sheet to the recording apparatus 702, using the input-output unit 406. The sheet feeding method is similar to that described with reference to FIG. 5. The user sets the recording medium, and issues a feed start instruction to the recording apparatus 702 from the input-output unit 406. Receiving the instruction, the CPU 401 starts sheet feeding. With the sheet feeding started, the recording medium is conveyed by the conveyance roller to a position capable of detection by the optical sensor 201 on the platen 106.

After the completion of the sheet feeding, in step S717, the recording apparatus 702 measures the characteristic values of the recording medium. The characteristic values are measured by processing similar to that of steps S102 and S103 in FIG. 5. The carriage 101 initially moves in the X direction to move the optical sensor 201 to above the recording medium. The optical sensor 201 then acquires the regular reflection value, the diffused reflection value, and the paper thickness of the recording medium. The measurements are once stored in a memory, such as the RAM 403.

In step S718, the CPU 401 calculates a regular reflection value V1L_newmedia, a diffused reflection value V2L_newmedia, and a paper thickness V3L_newmedia that are reference values of the characteristic values, and correction values α_newmedia, β_newmedia, and γ_newmedia of the respective characteristic values, based on the measurements acquired in step S717. The CPU 401 also calculates extraction limit values J1_newmedia, J1'_newmedia, J2_newmedia, J2'_newmedia, J3_newmedia, and J3'_newmedia indicating the extraction ranges, and training limit values L1_newmedia, L1'_newmedia, L2_newmedia, L2'_newmedia, L3_newmedia, and L3'_newmedia indicating the training ranges based on the measurements. The calculated values are stored into the EEPROM 404. In the EEPROM 404, the reference values of the characteristic values are stored in the areas illustrated in FIG. 7A, the correction values in the areas illustrated in FIG. 7B, and the extraction limit values and the training limit values in the areas illustrated in FIG. 7C. A method for calculating the values will be described below.

In the present exemplary embodiment, the measurements acquired in step S717 are not simply used as the reference values of the characteristic values but divided into reference values and correction values of the characteristic values so that other recording apparatuses can also extract the user-registered sheet as a candidate. This can reduce deviations in the reference values of the characteristic values due to attachment errors of the recording apparatus where the characteristic values are measured. The reference values of the characteristic values are then transmitted to other recording apparatuses, and the other recording apparatuses can extract the user-registered sheet with high accuracy by correcting the transmitted reference values of the characteristic values by themselves.

In step S719, the recording apparatus 702 transmits the reference values of the characteristic values calculated in step S718 to the host computer 701.

The host computer 701 receives the reference values of the characteristic values. In step S720, the host computer 701 stores the received reference values of the characteristic values in association with the sheet name. The reference values of the characteristic values and the sheet name are then used in registering the currently stored user-registered sheet in other recording apparatuses. A case where another recording apparatus registers the user-registered sheet will be described below with reference to FIG. 10B.

A method for calculating the reference values, correction values, extraction limit values, and training limit values of the characteristic values in step S718 will now be described.

The regular reflection value and the paper thickness vary greatly in value with a change in the distance between the optical sensor 201 and the recording medium 105. The diffused reflection value varies less with a change in the distance between the optical sensor 201 and the recording medium 105. The distance between the optical sensor 201 and the recording medium 105 can vary from one recording apparatus to another due to attachment errors. In the present exemplary embodiment, for the regular reflection value and the paper thickness, the reference values of the characteristic values are therefore calculated backward from the measurements acquired in step S717 using the correction values. As for the diffused reflection value, the measurement is simply used as the reference value of the characteristic value.

The correction values of the regular reflection value and the paper thickness are averages of the correction values for recording media that are set in the recording apparatus 702 and used before. The purpose of the averaging is to reduce the effects of other factors on the correction values, since the correction values are considered to be affected by differences between the reference values of the characteristic values and the measurements obtained by the optical sensor 201 due to assembly errors. Suppose, for example, that the recording media of which the EEPROM 404 has a use history are plain paper A, plain paper B, plain paper C, glossy paper D, glossy paper F, and coated paper H. In such a case, the reference values of the characteristic values of the user-registered sheet are given by the following:

$V1L\_newmedia = V1/average(\alpha\_a, \alpha\_b, \alpha\_c, \alpha\_d, \alpha\_f, \alpha\_h)$, $V2L\_newmedia = V2$, and $V3L\_newmedia = V3/average(\gamma\_a, \gamma\_b, \gamma\_c, \gamma\_d, \gamma\_f, \gamma\_h)$.

The correction values for the user-registered sheet are given by the following:

$\alpha\_newmedia = average(\alpha\_a, \alpha\_b, \alpha\_c, \alpha\_d, \alpha\_f, \alpha\_h)$, $\beta\_newmedia = 1$, and $\gamma\_newmedia = average(\gamma\_a, \gamma\_b, \gamma\_c, \gamma\_d, \gamma\_f, \gamma\_h)$.

If the characteristic values are measured at the factory in advance and the correction values are stored, averages of all the correction values can be set as the correction values for the user-registered sheet.

The extraction limit values and the training limit values are calculated based on the calculated reference values of the characteristic values. The extraction ranges and the training ranges of the user-registered sheet are set to ranges of predetermined sizes with respect to the reference values of the characteristic values. For example, suppose that the extraction range of the regular reflection value is a range of ±Q1 with respect to the reference value of the characteristic value, and the training range of the regular reflection value is a range of ±R1 with respect to the reference value of the characteristic value. In such a case, the extraction limit values and the training limit values are given by the following:

$J1\_newmedia = Q1$, $J1'\_newmedia = -Q1$, $L1\_newmedia = R1$, and $L1'\_newmedia = -R1$.

The extraction limit values and the training limit values of the other characteristic values are set in a similar manner. The extraction limit values and the training limit values of the diffused reflection value are given by the following:

$J2\_newmedia = Q2$, $J2'\_newmedia = -Q2$, $L2\_newmedia = R2$, and $L2'\_newmedia = -R2$.

The extraction limit values and the training limit values of the paper thickness are given by the following:

$J3\_newmedia = Q3$, $J3'\_newmedia = -Q3$, $L3\_newmedia = R3$, and $L3'\_newmedia = -R3$.

In such a manner, the values are calculated from the measurements.

Figure 10A:
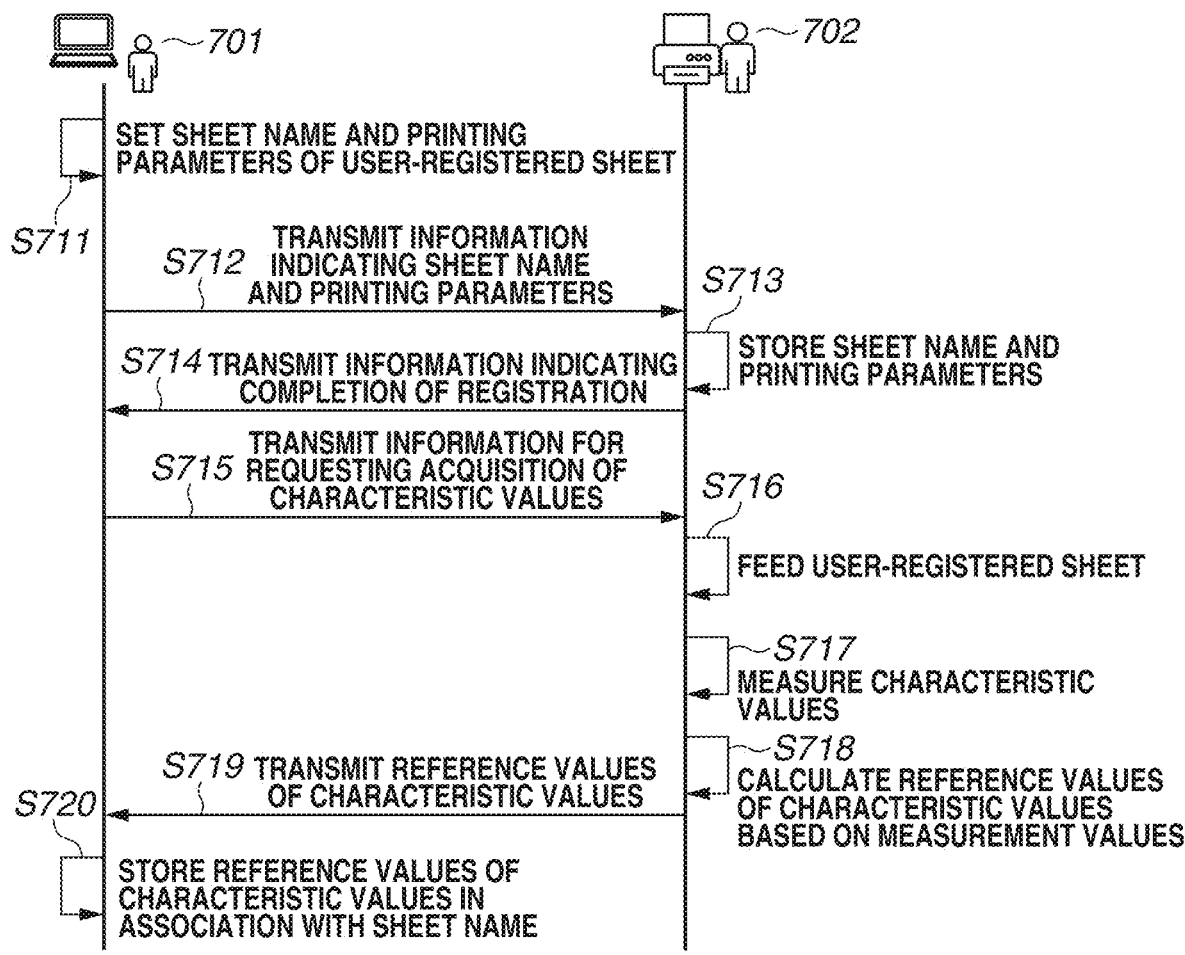
FIG. 10A is a diagram for describing a procedure for setting a user-registered sheet to be selectable.
Figure 10B:
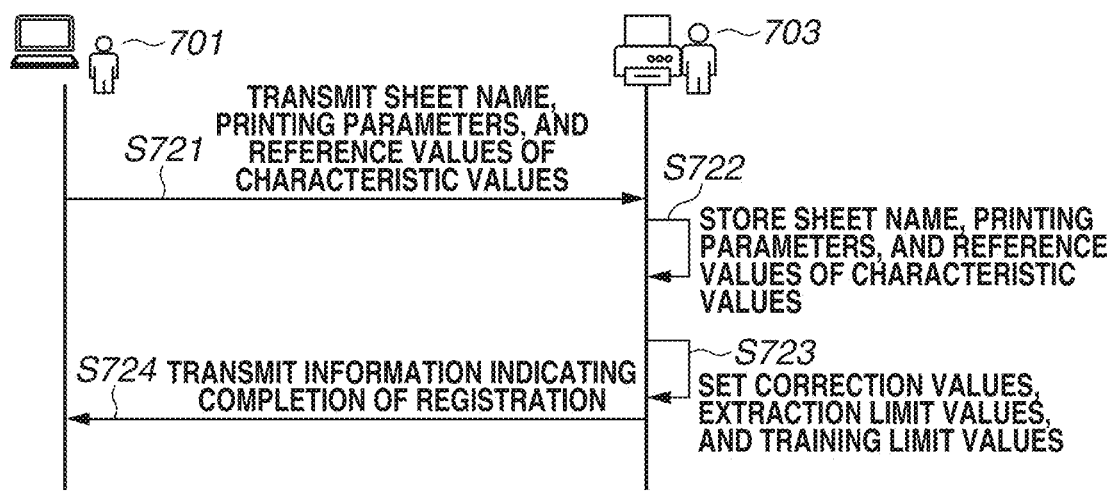
FIG. 10B is a diagram for describing a procedure for setting the user-registered sheet to be selectable.

FIG. 10B is a flowchart illustrating a procedure for registering the user-registered sheet registered in the recording apparatus 702 in another recording apparatus 703 connected to the host computer 701. The processing of FIG. 10B is performed after the completion of the processing of FIG. 10A. The name of the user-registered sheet, the printing parameters, and the reference values of the characteristic values are therefore stored in the host computer 701.

In step S721, the host computer 701 transmits the name of the user-registered sheet, the printing parameters, and the reference values of the characteristic values to the recording apparatus 703.

In step S722, the recording apparatus 703 stores the name of the user-registered sheet, the printing parameters, and the reference values of the characteristic values received into the EEPROM 404.

In step S723, the recording apparatus 703 sets the correction values, the extraction limit values, and the training limit values of the user-registered sheet. Like step S718, predetermined values are set for the extraction limit values and the training limit values. The correction values are calculated by the method described in step S718 of FIG. 10A. For example, suppose that the recording apparatus 703 has a use history of plain paper A, plain paper C, glossy paper D, glossy paper F, and coated paper G. In such a case, the recording apparatus 703 calculates the correction values for the user-registered sheet as follows:

$\alpha\_newmedia = \mathrm{average}(\alpha\_a, \alpha\_c, \alpha\_d, \alpha\_f, \alpha\_g)$, $\beta\_newmedia = 1$, and $\gamma\_newmedia = \mathrm{average}(\gamma\_a, \gamma\_c, \gamma\_d, \gamma\_f, \gamma\_g)$.

As described above, the reference values of the characteristic values are calculated based on the measurements acquired by a recording apparatus. Such reference values of the characteristic values can be used by other recording apparatuses as well. This can reduce the user's time and trouble in using the same user-registered sheet on a plurality of recording apparatuses having the same functions since the characteristic value measurement operation has only to be performed for the first time. Moreover, the reference values can be calculated with a reduction in the effect of attachment errors specific to each recording apparatus. Other recording apparatuses can thus also detect the user-registered sheet and notify of the user-registered sheet as a candidate with high accuracy.

Using this method, for example, a recording medium vendor selling a recording medium of the own company can sell the recording medium bundled with the parameters of the reference values of the characteristic values. The recording medium can be subjected to the detection of a type of recording medium by registering the reference values of the characteristic values without the customer conducting the operation of measuring the characteristic values using an optical sensor to set the reference values of the characteristic values.

In the present exemplary embodiment, the host computer 701 is described to be a host common between the recording apparatuses 702 and 703. However, the recording apparatuses 702 and 703 can be connected with respective different host computers. In such a case, various parameter groups generated by the host computer 701 connected with the recording apparatus 702 can be copied to another host computer connected with the recording apparatus 703. If the name of the user-registered sheet and the printing parameters can be set using the input-output unit 406 of the recording apparatus 100 and the recording apparatuses can exchange information with each other, the processing described with reference to FIGS. 10A and 10B can be implemented without a host computer.

In the first exemplary embodiment, the correction values for the user-registered sheet are set on the assumption that the correction values mainly include deviations due to attachment errors. In a second exemplary embodiment, the correction values for the user-registered sheet are set by taking into account the fact that the correction values can also include deviations due to other factors. Differences from the first exemplary embodiment will mainly be described.

Ink discharged from recording heads 102 produces mist that gets separated from the main droplets and hangs in the air inside the recording apparatus without impinging on the recording medium. If such mist adheres to the LEDs or photodiodes of an optical sensor 201, the measurement output decreases. The effect of the decrease in the output due to the mist on the measurements has different tendencies depending on the paper type. By contrast, the effect of assembly errors on the measurements does not vary much in tendency depending on the paper type.

In the present exemplary embodiment, the correction values set in step S718 of FIG. 10A at a stage where the recording volume is small are regarded as correction values due to assembly errors, and used as correction values common among all types (common correction values). When a user-registered sheet is added, the common correction values are set as the correction values. A specific example will be described.

Suppose that recording media included in the use history are plain paper A, glossy paper D, and coated paper H. Suppose also that recording media fed at a stage where the number of executions of sheet feeding is small are plain paper A and coated paper H. In such a case, the correction values for the user-registered sheet are set as follows:

$\alpha$_newmedia=average($\alpha$_a,$\alpha$_h), $\beta$_newmedia=average($\beta$_a,$\beta$_h), and $\gamma$_newmedia=average($\gamma$_a,$\gamma$_h).

The reference values of the characteristic values are set as follows:

$V1L$_newmedia=$V1$/average($\alpha$_a,$\alpha$_h), $V2L$_newmedia=$V2$/average($\beta$_a,$\beta$_h), and $V3L$_newmedia=$V3$/average($\gamma$_a,$\gamma$_h).

The effect of the mist, which varies depending on the type of recording medium, is thereby prevented from being reflected on the correction values for the user-registered sheet.

An example of the case where the user-registered sheet set thus is applied to another recording apparatus 703 in FIG. 10B will now be described. In step S723 of FIG. 10B, the recording apparatus 703 sets the correction values for the user-registered sheet. If the use history includes plain paper B and glossy paper C, the correction values are given by the following:

$\alpha$_newmedia=average($\alpha$_b,$\alpha$_c), $\beta$_newmedia=average($\beta$_b,$\beta$_c), and $\gamma$_newmedia=average($\gamma$_b,$\gamma$_c).

The correction values can be set by a different method. The effect of the adhesion of mist to the optical sensor on the measurements can have a similar tendency depending on whether the recording medium has an ink absorbing layer at the surface, and if there is an absorbing layer, depending on the thickness of the absorbing layer. For example, plain paper does not include an absorbing layer, and the effects on the measurements of plain paper A, plain paper B, and plain paper C included in the plain paper category have a similar tendency. The effects on the measurements of the recording media included in the category of plain paper having no absorbing layer and the effects on the measurements of the recording media included in the category of glossy paper having an absorbing layer have different tendencies.

In view of this, which category the user-registered sheet is included in can be determined, and the averages of the correction values for the types of recording media included in the determined category can be set as the correction values for the user-registered sheet. The reference values of the characteristic values of the user-registered sheet are then calculated based on the correction values.

Which category the user-registered sheet is included in is determined based on closeness of the comparative values of the already registered recording media, i.e., the reference values of the characteristic values, multiplied by the correction values, and the measurements of the user-registered sheet measured in step S717. The category to which the closest type of recording medium belongs is determined to be the category of the user-registered sheet.

As described above, the correction values and the reference values of the characteristic values of the user-registered sheet are set by using the correction values for a type of recording medium close to the user-registered sheet. The correction values and the reference values of the characteristic values can thereby be set with the effect of mist taken into account.

In a third exemplary embodiment, differences from the foregoing exemplary embodiments will mainly be described.

Recording apparatuses can often be used with a user specification different from the actual paper type. For example, the user often specifies plain paper when recycled paper is in use. Since recycled paper and plain paper have different optical reflection characteristics at the surface, the result can be as follows: Suppose that, in step S112 of FIG. 5, the user selects plain paper A when selecting the recording medium to be used from an input-output unit 406 upon sheet feeding. Suppose also that the actually fed recording medium is recycled paper $\Omega$. In such a case, the measurements of the characteristics of the recording medium measured by an optical sensor 201 can be significantly different from the values to be compared with the measurements, which are determined from the reference values of the characteristic values and the correction values for plain paper A stored in advance. If the measurements of recycled paper $\Omega$ are stored into the EEPROM 404 in step S205 or S206 of FIG. 9, and the correction values are updated based on the stored measurements, the resulting correction values are far from ideal ones. If the correction values for the user-registered sheet are set using such correction values and then the reference values of the characteristic values are calculated backward, reference values significantly different from the original reference values of the characteristic values can be set.

In the present exemplary embodiment, the correction values for a type of recording medium determined to be far from the ideal ones are therefore not used to calculate the correction values for the user-registered sheet. A method for calculating the correction values and the reference values of the characteristic values of the user-registered sheet in step S718 of FIG. 10A according to the present exemplary embodiment will now be described.

A recording apparatus 702 initially compares the correction values for all the types of recording media registered in the EEPROM 404, and determines whether the correction values fall within certain ranges. The determination can be made by determining whether the correction values for a paper type fall within certain values from the correction values for another paper type. Another method is to sort the correction values, draw distribution histograms, and determine whether the correction values are within 3$\sigma$. If the correction values thus fall within certain ranges, the user selection is determined to not be different from the actual type of recording medium. The reason is that the correction values reflect deviations from the reference values of the characteristic values set in advance due to attachment errors and due to mist adhering to the optical sensor 201. As described in the second exemplary embodiment, the effect of deviations due to the mist adhering to the optical sensor 201 varies from one type of recording medium to another, but not much. The correction values are therefore considered to be somewhat similar values regardless of the paper type. The correction values for a type of recording medium falling outside a certain range are thus determined to have been calculated using the measurements of a different type of recording medium.

For example, suppose that recording media included in the use history are plain paper A, glossy paper D, and coated paper H. Suppose also that histograms of the respective correction values are drawn from the correction values for plain paper A, glossy paper D, and coated paper H, and the correction values for plain paper A do not fall within 3σ. In such a case, averages of the correction values for glossy paper D and coated paper H are set as the correction values for the user-registered sheet:

$\alpha\_newmedia = average(\alpha\_d, \alpha\_h),$ $\beta\_newmedia = average(\beta\_d, \beta\_h),$ and $\gamma\_newmedia = average(\gamma\_d, \gamma\_h).$ The reference values of the characteristic values of the user-registered sheet are then set as follows:

$V1L\_newmedia = V1/average(\alpha\_d, \alpha\_h),$ $V2L\_newmedia = V2/average(\beta\_d, \beta\_h),$ and $V3L\_newmedia = V3/average(\gamma\_d, \gamma\_h).$ As described above, even if the type of recording medium selected by the user and the type of actually used recording medium are different, appropriate correction values and reference values of the characteristic values can be set for the user-registered sheet.

A method for setting correction values and reference values of characteristic values of a user-registered sheet in step S718 of FIG. 10A according to a fourth exemplary embodiment will now be described. Differences from the foregoing exemplary embodiments will mainly be described.

Suppose that the measurements acquired in step S717 are close to the comparative values of an existing type of recording medium stored in an EEPROM 404, i.e., the reference values of the characteristic values, multiplied by the correction values. Here, the measurements shall be close to the comparative values of plain paper A. In such a case, plain paper A and the user-registered sheet are considered to be recording media having similar characteristics. In the present exemplary embodiment, the correction values and the reference values of the characteristic values of plain paper A are set as the correction values and the reference values of the characteristic values of the user-registered sheet:

$\alpha\_newmedia = \alpha\_a,$ $\beta\_newmedia = \beta\_a,$ $\gamma\_newmedia = \gamma\_a,$ $V1L\_newmedia = V1L\_a$ $V2L\_newmedia = V2L\_a,$ and $V3L\_newmedia = V3L\_a.$ If the user selects plain paper A or the user-registered sheet in feeding a sheet the next and subsequent times, the correction values for the selected recording medium are updated by the correction value update processing of FIG. 9. As the update is repeated, the values of plain paper A and the user-selected sheet become more appropriate for their detection, and the determination accuracy increases.

The present invention is not limited to the foregoing exemplary embodiments, and various changes and modifications can be made without departing from the spirit and scope of the present invention. The following claims are therefore appended to make the scope of the present invention public.

According to an exemplary embodiment of the present invention, a type of recording medium not stored in advance can be made selectable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system comprising:
   a first measurement unit configured to measure a characteristic of a recording medium;
   a first storage unit configured to store a reference value of a characteristic value corresponding to a type of recording medium in advance;
   a first extraction unit configured to extract a candidate for a type of recording medium measured by the first measurement unit based on a result of measurement by the first measurement unit and the reference value of the characteristic value stored in the first storage unit in advance;
   a first information acquisition unit configured to acquire information corresponding to a type of recording medium determined to be the type of recording medium measured by the first measurement unit; and
   a first correction value acquisition unit configured to acquire a correction value for correcting the reference value of the characteristic value of the type of recording medium indicated by the information acquired by the first information acquisition unit based on the reference value of the characteristic value of the type of recording medium indicated by the information and the result of measurement, wherein the first extraction unit is configured to, in extracting a candidate next time, extract the candidate for the type of recording medium based on the reference value of the characteristic value and the correction value, wherein the system further comprises a first determination unit configured to, if the first extraction unit extracts an unset recording medium that is not set in advance as a type of recording medium for the first extraction unit to extract, determine a reference value of a characteristic value of the unset recording medium based on a result of measurement of the characteristic of the unset recording medium by the first measurement unit and the correction value acquired by the first correction value acquisition unit for the type of recording medium stored in the first storage unit in advance, and wherein the first storage unit is configured to store the reference value of the characteristic value of the unset recording medium determined by the first determination unit.

2. The system according to claim 1, wherein the first determination unit is configured to determine a correction value for the unset recording medium based on the correction value acquired by the first correction value acquisition unit for the type of recording medium stored in the first storage unit in advance, and calculate the reference value of the characteristic value of the unset recording medium based on the correction value for the unset recording medium and the result of measurement of the unset recording medium by the first measurement unit.

3. The system according to claim 1, further comprising:
a second measurement unit configured to measure a characteristic of the recording medium;
a second storage unit configured to store a reference value of a characteristic value corresponding to the type of recording medium in advance; and
a second extraction unit configured to extract a candidate for the type of recording medium based on a result of measurement by the second measurement unit and the reference value of the characteristic value stored in the second storage unit in advance, wherein the second storage unit is configured to, if the second measurement unit measures the unset recording medium and the second extraction unit extracts the unset recording medium as a candidate based on the result of measurement of the unset recording medium, store the reference value of the characteristic value of the unset recording medium calculated by the first determination unit.

4. The system according to claim 3, further comprising a second determination unit configured to determination the reference value of the characteristic value of the unset recording medium, wherein the second determination unit is configured to store the reference value of the characteristic value of the unset recording medium to be used in extracting a candidate for the type of recording medium based on the result of measurement by the second measurement unit into the second storage unit.

5. The system according to claim 4, further comprising:
a second information acquisition unit configured to acquire information corresponding to the type of recording medium determined to be the type of recording medium measured by the second measurement unit; and
a second correction value acquisition unit configured to acquire a correction value for correcting the reference value of the characteristic value of the type of recording medium indicated by the information acquired by the second information acquisition unit based on the reference value of the characteristic value of the type of recording medium indicated by the information and the result of measurement by the second measurement unit, wherein the second determination unit is configured to determine the correction value for the unset recording medium based on the correction value acquired by the second correction value acquisition unit for the type of recording medium stored in the second storage unit in advance.

6. The system according to claim 3, comprising:
a first information processing apparatus including the first measurement unit, the first storage unit, the first extraction unit, and the first information acquisition unit; and
a second information processing apparatus including the second measurement unit, the second storage unit, and the second extraction unit.

7. The system according to claim 6, further comprising a third information processing apparatus,
wherein the third information processing apparatus includes a name acquisition unit configured to acquire a name of the unset recording medium, the name being set by a user,
wherein the third information processing apparatus is configured to, if the name is acquired by the name acquisition unit, transmit information indicating acquisition of the name by the name acquisition unit to the first information processing apparatus, and
wherein the first information processing apparatus is configured to measure the characteristic of the recording medium using the first measurement unit based on reception of the information indicating the acquisition of the name.

8. The system according to claim 7,
wherein the third information processing apparatus is configured to acquire information about the reference value of the characteristic value of the unset recording medium from the first storage unit,
wherein the third information processing apparatus is configured to, if the second measurement unit measures the unset recording medium and the unset recording medium is extracted as a candidate based on the result of measurement of the unset recording medium by the second extraction unit, transmit the information about the reference value of the characteristic value of the unset recording medium acquired from the first storage unit to the second information processing apparatus, and
wherein the second storage unit is configured to, if the second information processing apparatus receives the information about the reference value of the characteristic value of the unset recording medium, store the reference value of the characteristic value of the unset recording medium indicated by the received information.

9. The system according to claim 1, further comprising a name acquisition unit configured to acquire a name of the unset recording medium, the name being set by a user, wherein the first measurement unit is configured to start to measure the characteristic of the recording medium after the name acquisition unit acquires the name.

10. The system according to claim 1, comprising a first information processing apparatus,
wherein the first information processing apparatus includes the first measurement unit, the first storage unit, the first extraction unit, the first information acquisition unit, the first correction value acquisition unit, and the first determination unit.

11. The system according to claim 10, wherein the first information processing apparatus includes a recording head configured to record an image by discharging ink to the recording medium.

12. An information processing apparatus configured to acquire information to be used by an extraction apparatus configured to extract a candidate for a type of recording medium corresponding to a result of measurement of a characteristic of a recording medium by a measurement unit from types of recording media stored in a storage unit in advance based on the result of measurement, reference values of characteristic values corresponding to the types of recording media stored in advance, and correction values for correcting the reference values of the characteristic values of the respective types of recording media,
wherein the information processing apparatus is configured to, if the extraction apparatus is configured to extract as a candidate an unset recording medium that is not of a type stored in the storage unit, acquire a reference value of a characteristic value of the unset recording medium based on the correction values for the types of recording media stored in the storage unit and the result of measurement of the characteristic of the unset recording medium.

13. A method for determining a type of recording medium, comprising:
measuring a characteristic of a recording medium;
extracting a candidate for a type of recording medium of which the characteristic is measured, based on a reference value of a characteristic value corresponding to a type of recording medium stored in a storage unit in advance and a result of measurement of the characteristic of the recording medium;
acquiring information corresponding to a type of recording medium determined to be the type of recording medium of which the characteristic is measured;
acquiring a correction value for correcting the reference value of the characteristic value of the type of recording medium indicated by the acquired information based on the reference value of the characteristic value of the type of recording medium indicated by the information and the result of measurement;
in extracting a candidate for the type of recording medium next time, extracting a candidate for the type of recording medium of which the characteristic is measured, based on the reference value of the characteristic value stored in the storage unit and the acquired correction value; and
if an unset recording medium that is not set as a type of recording medium to be extracted in advance is to be extracted, measuring the characteristic of the unset recording medium, determining a reference value of a characteristic value of the unset recording medium based on a result of measurement of the characteristic of the unset recording medium and the correction value for the type of recording medium stored in the storage unit in advance, and storing the reference value of the characteristic value of the unset recording medium in the storage unit.

14. A storage medium storing a program for causing a computer to:
acquire a result of measurement of a characteristic of a recording medium;
extract a candidate for a type of recording medium of which the characteristic is measured, based on a reference value of a characteristic value corresponding to a type of recording medium stored in a storage unit in advance and the result of measurement;
acquire information corresponding to a type of recording medium determined to be the type of recording medium of which the characteristic is measured;
acquire a correction value for correcting the reference value of the characteristic value of the type of recording medium indicated by the acquired information based on the reference value of the characteristic value of the type of recording medium indicated by the information and the result of measurement;
in extracting a candidate for the type of recording medium next time, extract a candidate for the type of recording medium of which the characteristic is measured, based on the reference value of the characteristic value stored in the storage unit and the acquired correction value; and
if an unset recording medium that is not set as a type of recording medium to be extracted in advance is to be extracted, acquire a result of measurement of the characteristic of the unset recording medium, calculate a reference value of a characteristic value of the unset recording medium based on the result of measurement of the characteristic of the unset recording medium and the correction value for the type of recording medium stored in the storage unit in advance, and store the reference value of the characteristic value of the unset recording medium in the storage unit.

15. A storage medium storing a program for causing a computer to, if an extraction apparatus configured to extract a candidate for a type of recording medium corresponding to a result of measurement of a characteristic of a recording medium by a measurement unit from types of recording media stored in a storage unit in advance based on the result of measurement, reference values of characteristic values corresponding to the types of recording media stored in advance, and correction values for correcting the reference values of the characteristic values of the respective types of recording media extracts an unset recording medium that is not of a type stored in the storage unit as a candidate, acquire a reference value of a characteristic value of the unset recording medium based on the correction values for the types of recording media stored in the storage unit and the result of measurement of the characteristic of the unset recording medium.

* * * * *